United States Patent
Kim et al.

(10) Patent No.: US 9,736,674 B2
(45) Date of Patent: Aug. 15, 2017

(54) DISCOVERY SIGNAL TRANSMISSION METHOD OF TERMINAL PERFORMING D2D COMMUNICATION AND TERMINAL USING SAME

(71) Applicant: LG ELECTRONICS INC., Seoul (KR)

(72) Inventors: Myoungseob Kim, Seoul (KR); Hyukjin Chae, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 14/895,920

(22) PCT Filed: Jun. 2, 2014

(86) PCT No.: PCT/KR2014/004891
§ 371 (c)(1),
(2) Date: Dec. 3, 2015

(87) PCT Pub. No.: WO2014/196771
PCT Pub. Date: Dec. 11, 2014

(65) Prior Publication Data
US 2016/0127881 A1  May 5, 2016

Related U.S. Application Data

(60) Provisional application No. 61/830,602, filed on Jun. 3, 2013.

(51) Int. Cl.
*H04W 8/00* (2009.01)
*H04L 5/00* (2006.01)
(Continued)

(52) U.S. Cl.
CPC .......... *H04W 8/005* (2013.01); *H04L 5/0032* (2013.01); *H04L 5/0048* (2013.01);
(Continued)

(58) Field of Classification Search
CPC ....... H04L 5/00; H04L 5/0032; H04L 5/0048; H04L 5/0091; H04L 27/26;
(Continued)

(56) References Cited

U.S. PATENT DOCUMENTS 7,263,070 B1 *  8/2007  Delker .............. H04L 29/12207
                                                   370/254
9,288,829 B2 *  3/2016  Park ..................... H04W 8/005
(Continued)

FOREIGN PATENT DOCUMENTS

WO   2012/109272   8/2012
WO   2013/012222   1/2013
(Continued)

OTHER PUBLICATIONS

PCT International Application No. PCT/KR2014/004891, Written Opinion of the International Searching Authority dated Sep. 3, 2014, 1 page.

*Primary Examiner* — Tri H Phan
(74) *Attorney, Agent, or Firm* — Lee, Hong, Degerman, Kang & Waimey PC

(57) ABSTRACT

Provided are a discovery signal transmission method of a terminal supporting device-to-device (D2D) communication and a terminal device using such a method. The method comprises: directly receiving information on a specific discovery signal (DS) transmission mask or receiving discovery signal configuring information; selecting the specific DS transmission mask or one DS transmission mask from among a plurality of DS transmission masks indicated by the
(Continued)

DS configuring information; and transmitting a discovery signal on the basis of the selected DS transmission mask.

12 Claims, 14 Drawing Sheets

(51) Int. Cl.
    *H04W 76/02*     (2009.01)
    *H04L 27/26*     (2006.01)
(52) U.S. Cl.
    CPC ........ *H04L 5/0091* (2013.01); *H04L 27/2613* (2013.01); *H04W 76/023* (2013.01)
(58) Field of Classification Search
    CPC .... H04L 27/2613; H04W 8/00; H04W 8/005; H04W 76/02; H04W 76/023; H04W 88/00; H04W 88/02; H04B 7/26; H04J 11/00
    See application file for complete search history.

(56) References Cited

U.S. PATENT DOCUMENTS

| | | | |
|---|---|---|---|
| 9,565,545 B2* | 2/2017 | Kang ............... | H04W 8/005 |
| 2010/0254308 A1* | 10/2010 | Laroia ............. | H04W 8/005 |
| | | | 370/328 |
| 2011/0082940 A1* | 4/2011 | Montemurro ...... | H04L 69/24 |
| | | | 709/227 |
| 2013/0109301 A1 | 5/2013 | Hakola et al. | |
| 2014/0056220 A1* | 2/2014 | Poitau ............. | H04W 40/246 |
| | | | 370/328 |
| 2014/0112235 A1* | 4/2014 | Jung ............... | H04W 48/16 |
| | | | 370/329 |
| 2014/0328329 A1* | 11/2014 | Novlan ........... | H04W 72/042 |
| | | | 370/336 |
| 2015/0043448 A1* | 2/2015 | Chatterjee ........ | H04W 8/005 |
| | | | 370/329 |

FOREIGN PATENT DOCUMENTS

| | | |
|---|---|---|
| WO | 2013/025040 | 2/2013 |
| WO | 2013/025057 | 2/2013 |

* cited by examiner

DISCOVERY SIGNAL TRANSMISSION METHOD OF TERMINAL PERFORMING D2D COMMUNICATION AND TERMINAL USING SAME

CROSS-REFERENCE TO RELATED APPLICATIONS

This application is National Stage filing under 35 U.S.C. 371 of International Application No. PCT/KR2014/004891, filed on Jun. 2, 2014, which claims the benefit of U.S. Provisional Application No. 61/830,602, filed on Jun. 3, 2013, the contents of which are all hereby incorporated by reference herein in their entirety.

BACKGROUND OF THE INVENTION

Field of the Invention

The present invention relates to wireless communication, and more particularly, to a method of transmitting a discovery signal of a terminal for performing device-to-device (D2D) communication, and the terminal using the method.

Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A technology related to a relay station is one of main technologies for the LTE-advanced.

LTE/LTE-A provides a device-to-device (D2D) technique for performing D2D direct communication without an assistance of an evolved NodeB (eNB). Advantageously, D2D can improve system capacity, transfer rate, delay, and power consumption through a short-distance gain, a hop gain, and a frequency reuse gain. Meanwhile, when performing D2D communication, one of important procedures is to discover devices located in a short distance. For this, one device transmits a discovery signal, and other devices measure reception strength of the discovery signal to confirm whether D2D communication is possible.

Meanwhile, it may be necessary for each device for performing D2D communication to have a different period of discovery signal transmission according to a service type and a battery status. Further, if the number of devices for performing D2D communication is great, the discovery signal is transmitted preferably by decreasing a collision between the devices.

There is a need for a method of effectively transmitting the discovery signal by each of the devices for performing D2D communication, and an apparatus using the method.

SUMMARY OF THE INVENTION

The present invention provides a method of transmitting a discovery signal of a terminal for performing device-to-device (D2D) communication, and the terminal using the method.

In one aspect, provided is a method of transmitting a discovery signal (DS) of a terminal supporting device-to-device (D2D) communication. The method includes receiving directly information regarding a specific DS transmission mask or receiving DS configuration information, selecting the specific DS transmission mask or one of a plurality of DS transmission masks reported through the DS configuration information and transmitting the DS on the basis of the selected DS transmission mask.

In another aspect, provided is a terminal comprising a radio frequency (RF) unit for transmitting/receiving a radio signal and a processor operatively coupled to the RF unit. The processor is configured for receiving directly information regarding a specific discovery signal (DS) transmission mask or receiving DS configuration information, selecting the specific DS transmission mask or one of a plurality of DS transmission masks reported through the DS configuration information and transmitting the DS on the basis of the selected DS transmission mask.

A period of transmitting a discovery signal can be adjusted according to a characteristic of each device for performing device-to-device (D2D) communication, and even if there are a great number of devices for performing D2D communication, the discovery signal can be transmitted while decreasing a collision between the devices. Therefore, the discovery signal can be effectively transmitted.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA)

or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the 3GPP LTE/LTE-A. However, technical features of the present invention are not limited thereto.

A wireless communication system includes at least one evolved NodeB (eNB). Each eNB provides a communication service to a specific geographical region which is generally called a cell. The cell can be divided into a plurality of regions, each of which is called a sector. One or more cells may exist in one eNB. The eNB is generally a fixed station that communicates with a user equipment (UE) and may be referred to as another terminology, such as a base station (BS), a base transceiver system (BTS), an access point, an access network (AN), etc.

The UE may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Figure 1:
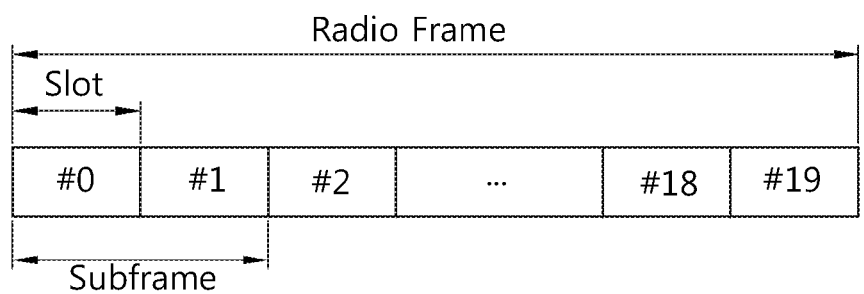
FIG. 1 shows a radio frame structure of $3^{rd}$ generation partnership project (3GPP) long term evolution (LTE).

FIG. 1 shows a radio frame structure of 3GPP LTE.

Referring to FIG. 1, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously. Hereinafter, a symbol may imply one OFDM symbol or one SC-FDMA symbol.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 1.

Figure 2:
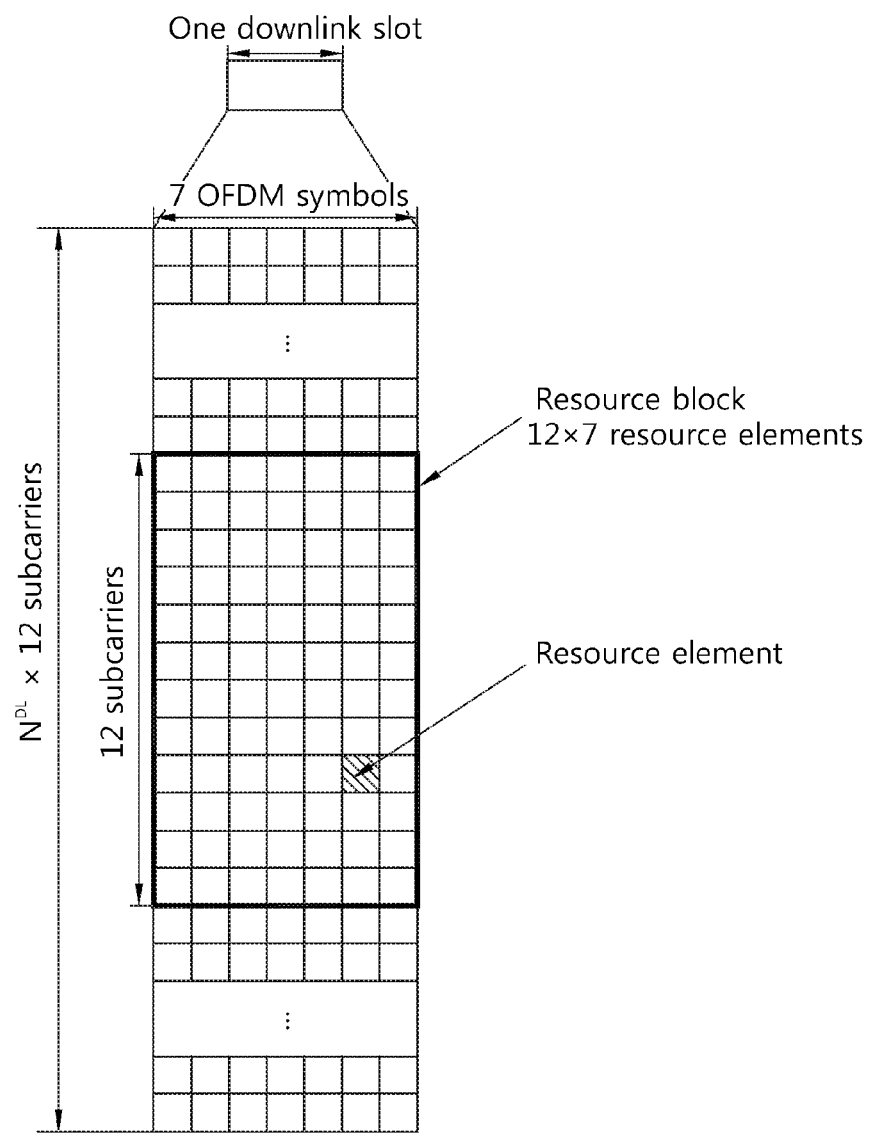
FIG. 2 shows an example of a resource grid for one downlink slot.

FIG. 2 shows an example of a resource grid for one downlink slot.

In FDD and TDD radio frames, one slot includes a plurality of OFDM symbols in a time domain and a plurality of resource blocks (RBs) in a frequency domain. The RB is a resource allocation unit, and includes a plurality of consecutive subcarriers in one slot.

Referring to FIG. 2, although it is described herein that one downlink slot includes 7 OFDM symbols and one RB includes 12 subcarriers in the frequency domain, this is for exemplary purposes only, and thus the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the downlink slot depends on a downlink transmission bandwidth determined in a cell. The resource grid described in FIG. 2 can also apply to uplink transmission.

Figure 3:
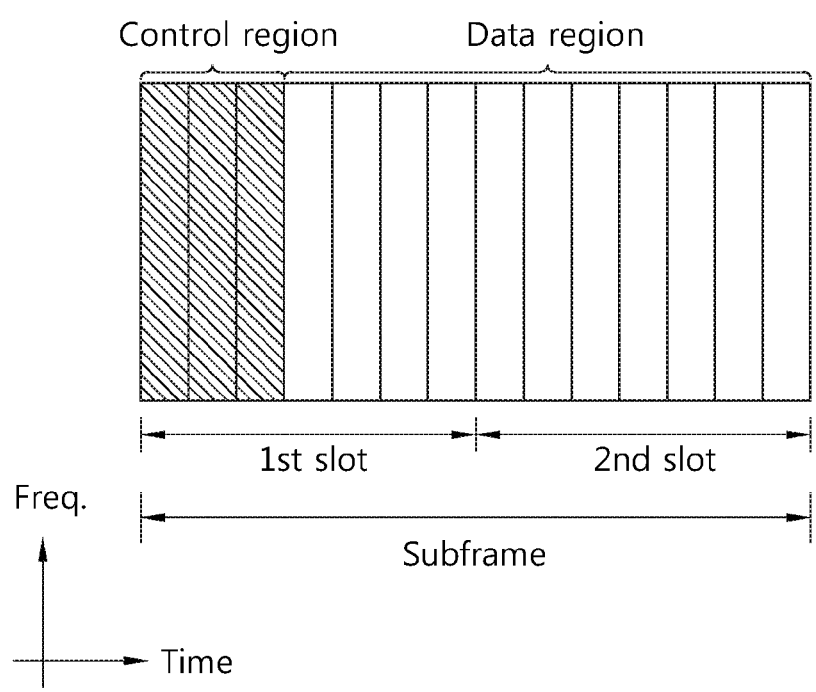
FIG. 3 shows a structure of a downlink subframe.

FIG. 3 shows a structure of a downlink subframe.

Referring to FIG. 3, the subframe includes two consecutive slots. A maximum of three OFDM symbols located in a front portion of a $1^{st}$ slot within the subframe correspond to a control region to which a physical downlink control channel (PDCCH) is allocated. The remaining OFDM symbols correspond to a data region to which a physical downlink shared channel (PDSCH) is allocated. In addition to the PDCCH, control channels such as a physical control format indicator channel (PCFICH), a physical hybrid automatic repeat request (HARQ) indicator channel (PHICH), etc., can be allocated to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region. The number of OFDM symbols included in the control region of the subframe can be known by using the PCFICH. The PHICH carries information indicating whether uplink data transmitted by the UE is successfully received.

The control region consists of a plurality of control channel elements (CCEs) as a logical CCE stream. Hereinafter, the CCE stream denotes a set of all CCEs constituting the control region in one subframe. The CCE corresponds to a plurality of resource element groups (REGs). For example, the CCE may correspond to 9 REGs. The REG is used to define mapping of a control channel onto a resource element. For example, one REG may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. The number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be an element of {1, 2, 4, 8}.

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 4:
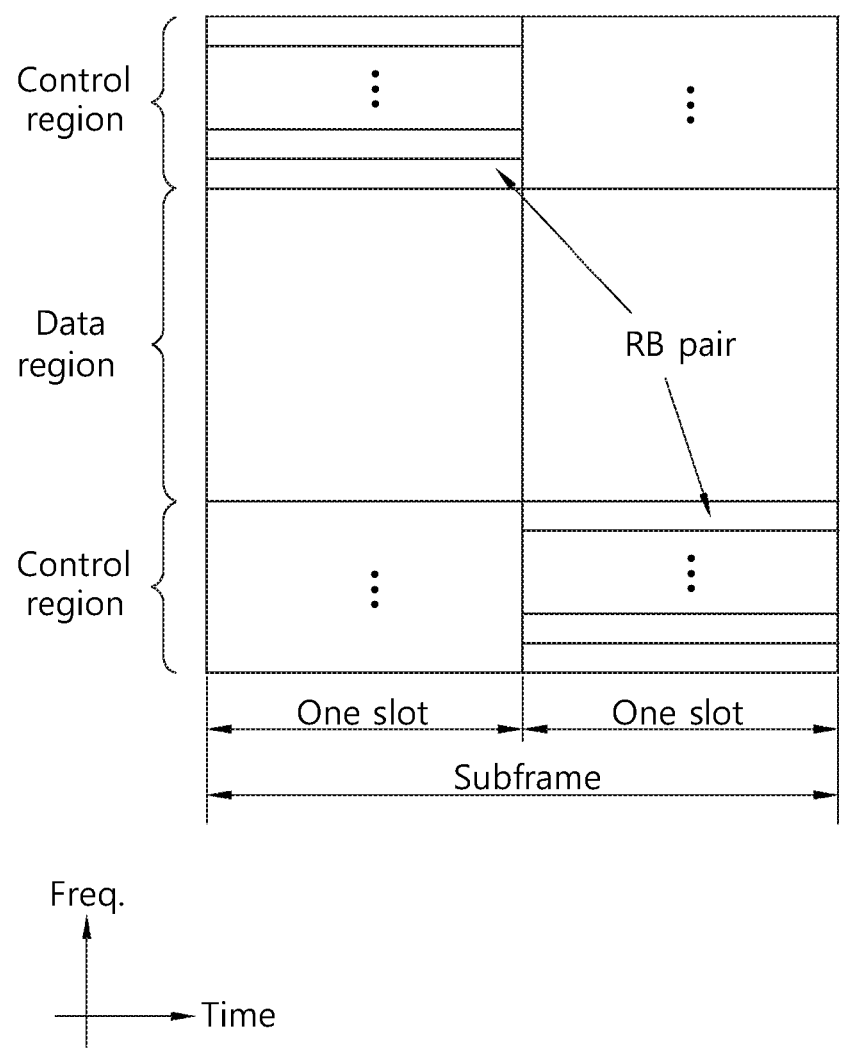
FIG. 4 shows a structure of an uplink subframe.

FIG. 4 shows a structure of an uplink subframe.

Referring to FIG. 4, the uplink subframe can be divided into a control region and a data region in the frequency domain. The control region is a region to which a physical uplink control channel (PUCCH) for carrying uplink control information is allocated. The data region is a region to which a physical uplink shared channel (PUSCH) for carrying user data is allocated.

The PUCCH for one UE is allocated in a pair of RBs. The RBs belonging to the RB pair occupy different subcarriers in each of two slots. This is called that the RB pair allocated to the PUCCH is frequency-hopped in a slot boundary.

The PUCCH can support multiple formats. That is, uplink control information having a different number of bits for each subframe can be transmitted according to a modulation scheme. For example, when using a binary phase shift keying (BPSK) (i.e., a PUCCH format 1a), 1-bit uplink control information can be transmitted on the PUCCH, and when using quadrature phase shift keying (QPSK) (i.e., a PUCCH format 1b), 2-bit uplink control information can be transmitted on the PUCCH. In addition thereto, examples of the PUCCH format include a format 1, a format 2, a format 2a, a format 2b, etc. For this, the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

A wireless communication system, for example, the wireless communication system described with reference to FIG. 1, may be a system using a multi-input multi-output (MIMO) technique, that is, may be a MIMO system. Being evolved from the conventional technique in which a single transmit (Tx) antenna and a single receive (Rx) antenna are used, the MIMO technique uses multiple Tx antennas and multiple Rx antennas to improve transfer efficiency of data to be transmitted or received. In other words, the MIMO technique is a technique of using a plurality of antennas in a transmitter or a receiver of the wireless communication system. Performance and communication capacity of the wireless communication system can be improved by using the MIMO technique. The MIMO system is also referred to as a multi-antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

A next-generation mobile communication technique requires a data transfer rate higher than that used in the conventional mobile communication technique. Therefore, a MIMO technique is essential to the next-generation mobile communication technique. The MIMO technique can be applied not only to an eNB but also to a UE or an RN, and thus can be used to overcome a limitation of a data transfer rate. In addition, the MIMO technique is drawing attention more than various other techniques due to a technical advantage in that data transmission efficiency can be improved without having to use an additional frequency band or without having to require additional transmission power.

First, mathematical modeling of a MIMO system will be described.

Figure 5:
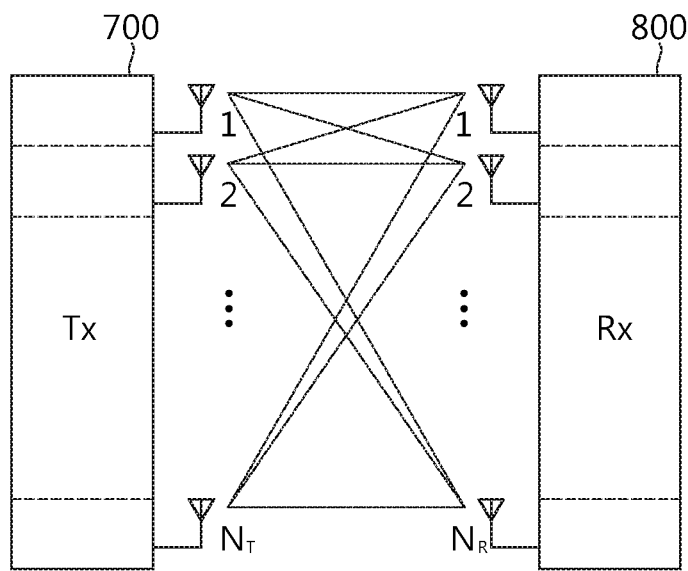
FIG. 5 shows a multi-input multi-output (MIMO) system.

FIG. 5 shows a MIMO system.

Referring to FIG. 5, a transmitter 700 has $N_T$ Tx antennas, and a receiver 800 has $N_R$ Rx antennas. In this case, ideal channel transmission capacity is increased in proportion to the number of antennas.

In theory, a data transfer rate obtained by the increase in channel transmission capacity can be expressed by the product between a maximum data rate $R_O$ obtained when using a single antenna and an increment rate $R_i$ generated when using multiple antennas. The increment rate $R_i$ can be expressed by Equation 1 below.

$$R_i = \min(N_T, N_R) \qquad \text{[Equation 1]}$$

If $N_T$ denotes the number of Tx antennas, transmission information may consist of up to $N_T$ different pieces of information. In this case, the transmission information can be expressed by Equation 2 below.

$$s = [s_1, s_2, \ldots, s_{N_T}]^T \qquad \text{[Equation 2]}$$

In Equation 2, s denotes a transmission information vector, and $s_1, s_2, \ldots, s_{N_T}$ denote information indicating each element of the transmission information vector. Each information can be transmitted with different transmission power. When each transmission power is denoted by ($P_1, P_2, \ldots, P_{N_T}$), the transmission information vector to which the transmission power is allocated can be expressed by Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Equation 3 can be expressed by the product between a transmission power diagonal matrix and a transmission information vector as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

A transmission information vectors $\hat{s}$ to which transmission power is applied is multiplied by a weight matrix W to generate Tx signals $x_1, x_2, \ldots, x_{N_T}$ transmitted in practice through $N_T$ Tx antennas. The weight matrix W takes a role of properly distributing transmission information to an individual antenna according to a transmission channel condition. If a Tx signal vector is denoted by x, it can be expressed by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, elements $w_{ij}$ ($1 \leq i \leq N_T$, $1 \leq j \leq N_T$) of the weight matrix denote a weight for an $i^{th}$ Tx antenna and $j^{th}$ transmission information. The weight matrix W is also referred to as a precoding matrix.

The Tx signal vector can include different transmission information according to a transmission scheme. For example, when applying spatial diversity, i.e., transmission diversity, all elements of the Tx signal vector may have the same transmission information. That is, $[s_1, s_2, \ldots, s_{nT}]$ may be the same information, for example, $[s_1, s_1, \ldots, s_1]$. Therefore, since the same transmission information is delivered to a receiver through a different channel, a diversity effect occurs, and transmission reliability increases.

Alternatively, when applying the spatial multiplexing, all elements of the transmission information of the Tx signal vector may be different from one another. That is, $s_1$, $s_2, \ldots, s_{nT}$ may be different information. Since different transmission information is delivered to the receiver through a different channel, advantageously, there is an increase in an amount of information that can be transmitted.

Of course, the transmission information can be delivered by using spatial multiplexing together with the spatial diversity. That is, in the above example, the same information is transmitted by using the spatial diversity through three Tx antennas, and different information can be transmitted by using the spatial multiplexing through the remaining Tx antennas. In this case, the transmission information vector can be configured such as $[s_1, s_1, s_1, s_2, s_3 \ldots, s_{nT-2}]$.

If $N_R$ denotes the number of Rx antennas in the receiver, a signal received in an individual Rx antenna can be denoted by $y_n (1 \leq n \leq N_R)$. In this case, an Rx signal vector y can be expressed by Equation 6 below.

$$y = [y_1, y_2, \ldots, y_{N_R}]^T \qquad [\text{Equation 6}]$$

When performing channel modeling in the MIMO system, each channel can be identified by using an index of a Tx antenna and an index of an Rx antenna. If the index of the Tx antenna is denoted by j and the index of the Rx antenna is denoted by i, a channel between the Tx antenna and the Rx antenna can be denoted by $h_{ij}$ (herein, it should be noted that the index of the Rx antenna is first indicated in a subscript indicating the channel and the index of the Tx antenna is indicated later).

Figure 6:
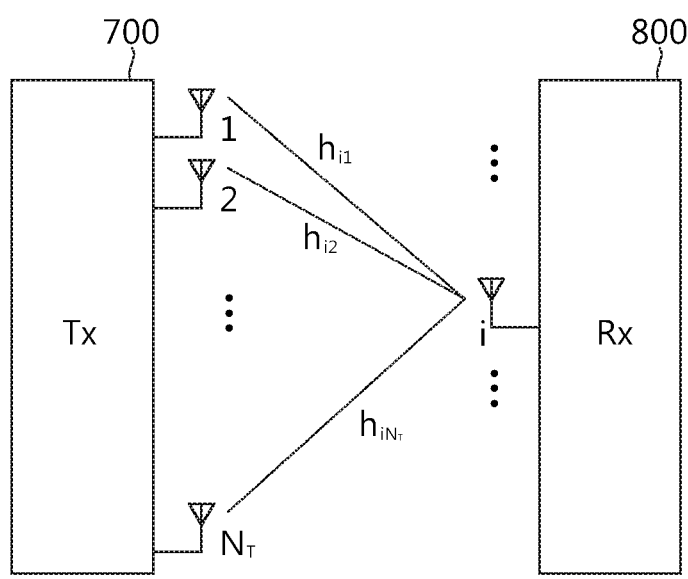
FIG. 6 shows an example of indicating a channel in a multi-antenna system.

FIG. 6 shows an example of indicating a channel in a multi-antenna system.

Referring to FIG. 6, channels for respective $N_T$ Tx antennas with respect to an Rx antenna i are denoted by $h_{i1}$, $h_{i2}, \ldots, h_{iN_T}$. For convenience of explanation, the channels can be expressed as a matrix or a vector. Then, the channels $h_{i1}, h_{i2}, \ldots, h_{iN_T}$ can be expressed in a vector form as shown in Equation 7 below.

$$h_i^T = [h_{i1}, h_{i2}, \ldots, h_{iN_T}] \qquad [\text{Equation 7}]$$

If all channels from $N_T$ Tx antennas to $N_R$ Rx antennas are expressed in a matrix form as a channel matrix H, the channel matrix H can be expressed by Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad [\text{Equation 8}]$$

A signal transmitted through a Tx antenna is transmitted through a channel expressed by Equation 8 above and is received in an Rx antenna. In this case, noise is added in an actual channel. Mathematically, the noise can be regarded as an additive white Gaussian noise (AWGN). If AWGNs added to respective Rx antennas are denoted by $n_1$, $n_2, \ldots, n_{N_R}$, for convenience of explanation, these AWGNs can be expressed as a vector of Equation 9 below.

$$n = [n_1, n_2, \ldots, n_{N_R}]^T \qquad [\text{Equation 9}]$$

An Rx signal vector y received in an Rx antenna can be expressed by Equation 10 below by considering the aforementioned AWGN, the Tx signal vector x, a channel matrix, etc.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad [\text{Equation 10}]$$

$$Hx + n$$

In the channel matrix H, the number of rows and the number of columns are determined according to the number of Tx antennas and the number of Rx antennas. In the channel matrix H, the number of rows is equal to the number of Rx antennas. Further, in the channel matrix H, the number of columns is equal to the number of Tx antennas. Therefore, the channel matrix H can be expressed by an $N_R \times N_T$ matrix.

In general, a matrix rank is defined by a smaller value between the number of independent rows and the number of independent columns. Therefore, the matrix rank cannot be greater than the number of columns or the number of rows, and a rank of the channel matrix H is determined by Equation 11 below.

$$\text{rank}(H) \leq \min(N_T, N_R) \qquad [\text{Equation 11}]$$

In general, transmission information (e.g., data) is easily distorted and modified while it is transmitted through a radio channel. Therefore, a reference signal (RS) is necessary to demodulate the transmission information in an error-free manner. The RS is a signal pre-known between the transmitter and the receiver and is transmitted together with the transmission information. Since the transmission information transmitted from the transmitter experiences a corresponding channel for each Tx antenna or for each layer, the RS can be allocated for each Tx antenna or for each layer. The RS for each Tx antenna or for each layer can be identified by using a resource (e.g., time, frequency, code, etc.). The RS can be used for two purposes, i.e., transmission information demodulation and channel estimation.

The RS can be classified into two types according to a range of a receiver which knows the RS in advance. A first type of the RS is known to only a specific receiver (e.g., a specific UE), and is called a dedicated RS (DRS). In this sense, the DRS is also called a UE-specific RS. A second type of the RS is known to all receivers in a cell, e.g., all UEs, and is called a common RS (CRS). The CRS is also called a cell-specific RS.

In addition, the RS can be classified according to a usage. For example, an RS used for data demodulation is called a demodulation RS (DM-RS). An RS used for feedback information indicating a channel state (e.g., CQI/PMI/RI) is called a channel state indicator-RS (CSI-RS). The aforementioned DRS can be used as a DM-RS. Hereinafter, it is premised that the DM-RS is a DRS.

Figure 7:
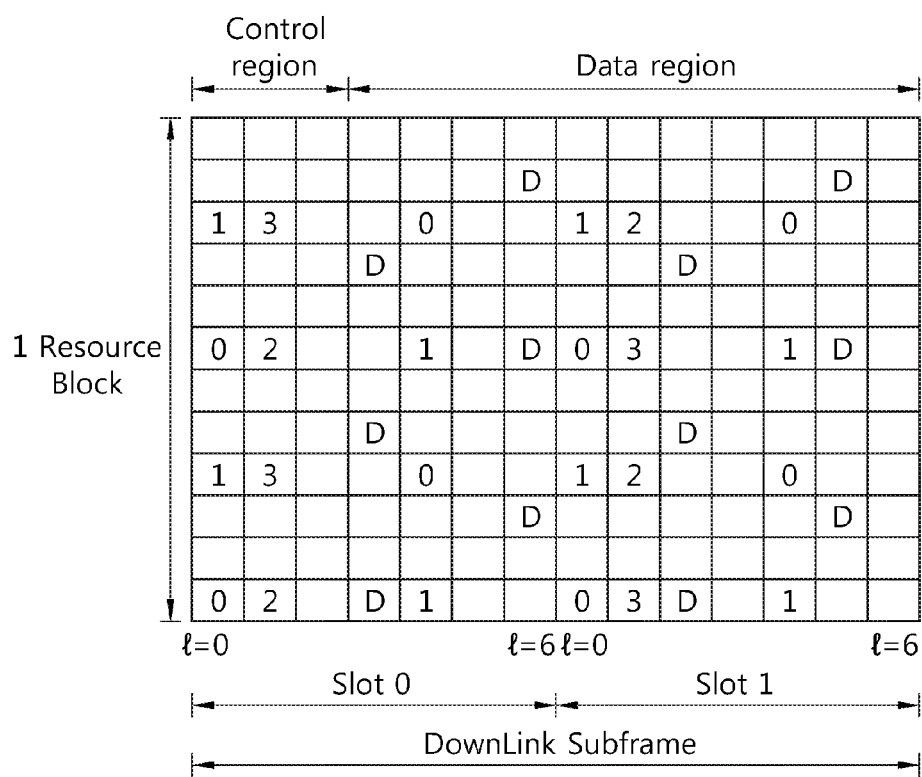
FIG. 7 shows an example of a reference signal (RS) structure capable of supporting four antenna ports in case of using a normal cyclic prefix (CP).
Figure 8:
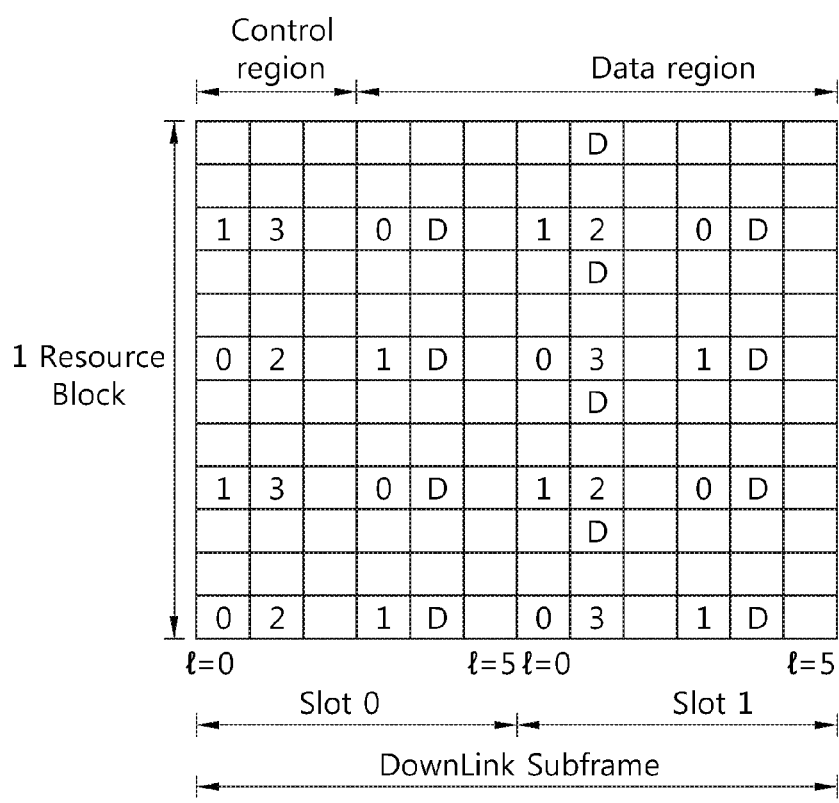
FIG. 8 shows an example of an RS structure capable of supporting four antenna ports in case of using an extended CP.

FIG. 7 shows an example of an RS structure capable of supporting four antenna ports in case of using a normal CP. FIG. 8 shows an example of an RS structure capable of supporting four antenna ports in case of using an extended CP. The RS structures of FIG. 7 and FIG. 8 are RS structures used in the conventional 3GPP LTE system.

In FIG. 7 and FIG. 8, a resource element indicated by any one of values 0 to 3 indicates a resource element for transmitting a cell-specific RS (CRS). In this case, any one value in the range of 0 to 3 indicates a supported antenna port. That is, resource elements marked with p (where p is any one of values 0 to 3) are resource elements to which a CRS for an antenna port p is mapped. The CRS is used for channel measurement and data demodulation for each antenna port. The CRS is transmitted in both a control region and a data region of a subframe.

In FIG. 7 and FIG. 8, a resource element marked with 'D' indicates a resource element to which a UE-specific RS (i.e., a DRS) is mapped. The UE-specific RS can be used in single-antenna port transmission of a PDSCH. A UE receives an indication on whether the UE-specific RS is transmitted through a high-layer signal, and if the PDSCH is transmitted, whether the UE-specific RS is valid. The UE-specific RS can be transmitted only when data demodulation is necessary. The UE-specific RS can be transmitted only in a data region of a subframe.

Meanwhile, a sounding reference signal (SRS) may be used in an uplink. The SRS is a reference signal transmitted by a UE to an eNB and is a reference signal which is not related to uplink data or control signal transmission. The SRS may be used for channel quality estimation for frequency selective scheduling in the uplink or may be used for other usages. For example, the SRS may be used in power control, initial modulation and coding scheme (MCS) selection, initial power control for data transmission, etc.

A subframe at which the SRS is transmitted is indicated by a cell-specific parameter. The SRS and a DM-RS are located in different SC-FDMA symbols. PUSCH data is not transmitted in an SC-FDMA symbol in which the SRS is transmitted. The SRS may be transmitted in a last SC-FDMA symbol of a subframe.

[Carrier Aggregation System]

Figure 9:
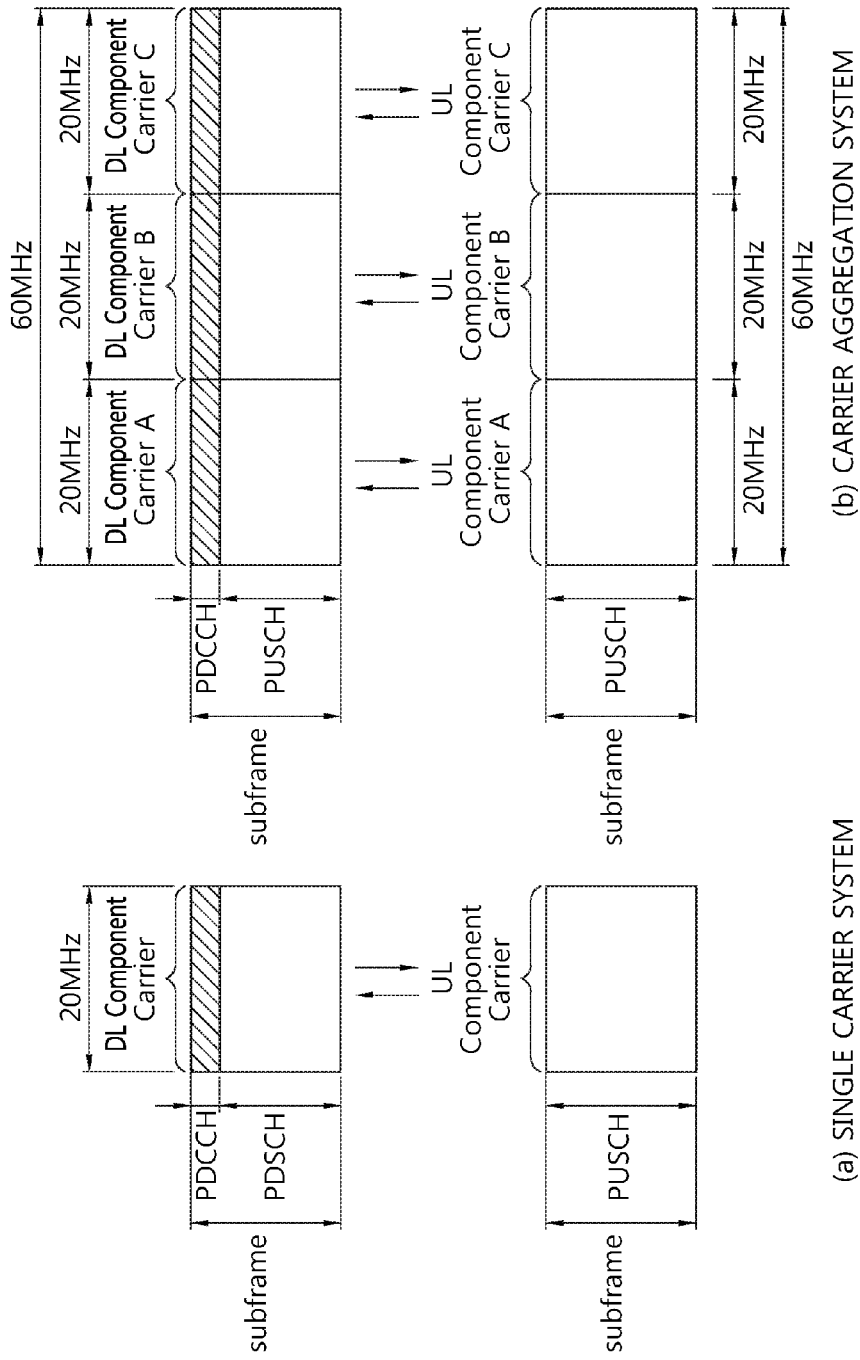
FIG. 9 shows an example of comparing the legacy single carrier system and a carrier aggregation system.

FIG. 9 shows an example of comparing the legacy single carrier system and a carrier aggregation system.

Referring to FIG. 9, the single carrier system supports only one carrier as to a UE in an uplink and a downlink. Although the carrier may have various bandwidths, only one carrier is assigned to the UE. Meanwhile, multiple component carriers (CCs), i.e., DL CCs A to C and UL CCs A to C, can be assigned to the UE in the carrier aggregation (CA) system. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted that both cases of contiguous CCs and non-contiguous CCs are included.

A CC which is a target when aggregating one or more CCs may directly use a bandwidth that is used in the legacy system in order to provide backward compatibility with the legacy system. For example, a 3GPP LTE system may support a bandwidth of 1.4 MHz, 3 MHz, 5 MHz, 10 MHz, 15 MHz, and 20 MHz, and a 3GPP LTE-A system may configure a wideband of 20 MHz or higher by using only the bandwidth of the 3GPP LTE system. Alternatively, the wideband may be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if a carrier aggregation (CA) is not considered, uplink and downlink frequency resources may always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration may exist in an activation or deactivation state. Herein, the activation implies that data transmission or reception is performed or is in a ready state. The UE may monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE may receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be divided into a primary cell, a secondary cell, and a serving cell.

The primary cell implies a cell which operates at a primary frequency, and also implies a cell in which the UE performs an initial connection establishment procedure or a connection re-establishment procedure with respect to an eNB or a cell indicated as the primary cell in a handover procedure.

The secondary cell implies a cell which operates at a secondary frequency, and is configured when an RRC connection is once established and is used to provide an additional radio resource.

The serving cell is configured with the primary cell when a carrier aggregation is not configured or when the UE cannot provide the carrier aggregation. If the carrier aggregation is configured, the term 'serving cell' is used to indicate a cell configured to the UE, and may consist of a plurality of cells. One serving cell may consist of one DL CC or a pair of {DL CC, UL CC}. The plurality of serving cells may consist of a set consisting of a primary cell and one or more of all secondary cells.

A primary component carrier (PCC) denotes a CC corresponding to the primary cell. The PCC is a CC that establishes an initial connection (or RRC connection) with the eNB among several CCs. The PCC serves for connection (or RRC connection) for signaling related to a plurality of CCs, and is a CC that manages UE context which is connection information related to the UE. In addition, the PCC establishes connection with the UE, and thus always exists in an activation state when in an RRC connected mode. A DL CC corresponding to the primary cell is called a DL primary component carrier (PCC), and a UL CC corresponding to the primary cell is called a UL PCC.

A secondary component carrier (SCC) denotes a CC corresponding to the secondary cell. That is, the SCC is a CC allocated to the UE in addition to the PCC. The SCC is an extended carrier used by the UE for additional resource allocation or the like in addition to the PCC, and can be divided into an activation state and a deactivation state. A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is a cell which is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, the primary cell always consists of a pair of a DL PCC and a UL PCC. Seventh, for each UE, a different CC can be configured as the primary cell. Eighth, the primary cell can be replaced only through a handover, cell selection/reselection process. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed with only one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system may support a plurality of CCs, that is, a plurality of serving cells unlike the single carrier system.

Such a carrier aggregation system may support cross-carrier scheduling. The cross-carrier scheduling is a scheduling method capable of performing resource allocation of a PDSCH transmitted through a different component carrier by using a PDCCH transmitted through a specific component carrier and/or resource allocation of a PUSCH transmitted through other component carriers except for a component carrier fundamentally linked with the specific component carrier. That is, the PDCCH and the PDSCH may be transmitted through different DL CCs, and a PUSCH may be transmitted through a UL CC different from a UL CC linked with a DL CC to which a PDCCH including a UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator is called a carrier indication field (CIF).

The carrier aggregation system for supporting the cross-carrier scheduling may include a carrier indicator field (CIF) in the legacy downlink control information (DCI) format. In the system for supporting the cross-carrier scheduling, for example, an LTE-A system, since the CIF is added to the legacy DCI format (that is, a DCI format used in LTE), the number of bits may be further extended by 3 bits, and a PDCCH structure may reuse the legacy coding method, resource allocation method (that is, CCE based resource mapping), etc.

Figure 10:
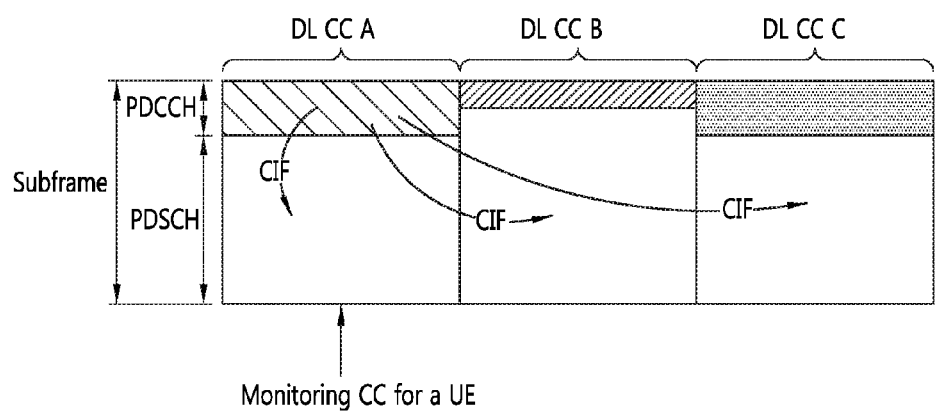
FIG. 10 shows an example of a subframe structure for cross-carrier scheduling in a carrier aggregation system.

FIG. 10 shows an example of a subframe structure for cross-carrier scheduling in a carrier aggregation system.

Referring to FIG. 10, an eNB may configure a PDCCH monitoring DL CC group. The PDCCH monitoring DL CC group is configured as one DL CC among all aggregated DL CCs. If the cross-carrier scheduling is configured, a UE performs PDCCH monitoring/decoding for only a DL CC included in the PDCCH monitoring DL CC group. In other words, the eNB transmits a PDCCH with respect to a PDSCH/PUSCH to be scheduled through only the DL CCs included in the PDCCH monitoring DL CC group. The PDCCH monitoring DL CC group may be configured in a UE-specific, UE group-specific, or cell-specific manner.

In FIG. 10, it is shown an example in which three DL CCs (i.e., DL CC A, DL CC B, DL CC C) are aggregated, and the DL CC A is configured as a PDCCH monitoring DL CC. The UE may receive a DL grant for a PDSCH of the DL CC A, the DL CC B, and the DL CC C through the PDCCH of the DL CC A. DCI transmitted through the PDCCH of the DL CC A includes a CIF to indicate to which DL CC the DCI belongs.

Now, a method of D2D communication and discovery signal transmission is described.

Figure 11:
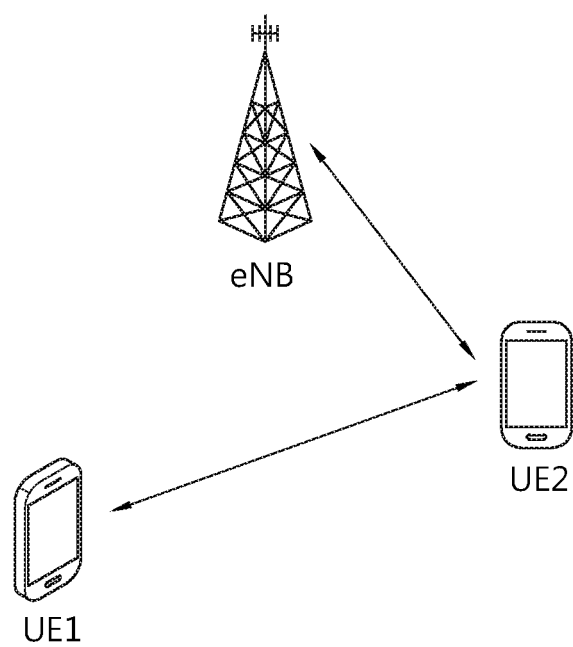
FIG. 11 shows an example of a D2D communication system. D2D communication implies a UE-to-UE direct communication technique.

FIG. 11 shows an example of a D2D communication system. D2D communication implies a UE-to-UE direct communication technique. Through the D2D communication, a radio link may be established between transmitting/receiving end pairs (e.g., D2D peers) to perform direct communication. Thus, a reuse rate of a radio resource is increased, thereby improving band efficiency. As shown in FIG. 11, a UE2 can directly communicate with a UE1 without an assistance of a network (e.g., an eNB) (i.e., UE-UE communication/link). Further, the UE2 may directly communicate with the eNB according to the conventional method (UE-eNB link/communication). For the D2D communication, a D2D UE may discover another D2D UE through a D2D discovery process, and thereafter may establish a D2D link. Herein, the UE-UE communication/link implies a UE-UE communication or link, and both terms are used without distinction. A UE for performing D2D communication (hereinafter, a D2D UE) may be divided into a server UE and a client UE according to a service. For example, in FIG. 11, the UE2 may operate as the server UE, and the UE1 may operate as the client UE.

In the D2D communication, the discovery implies discovering or recognizing of a peer device for performing the D2D communication. The discovery may be related to a technique of discovering the peer device which performs the D2D communication, discovering a service, forming a group, inviting a device, or the like.

Figure 12:
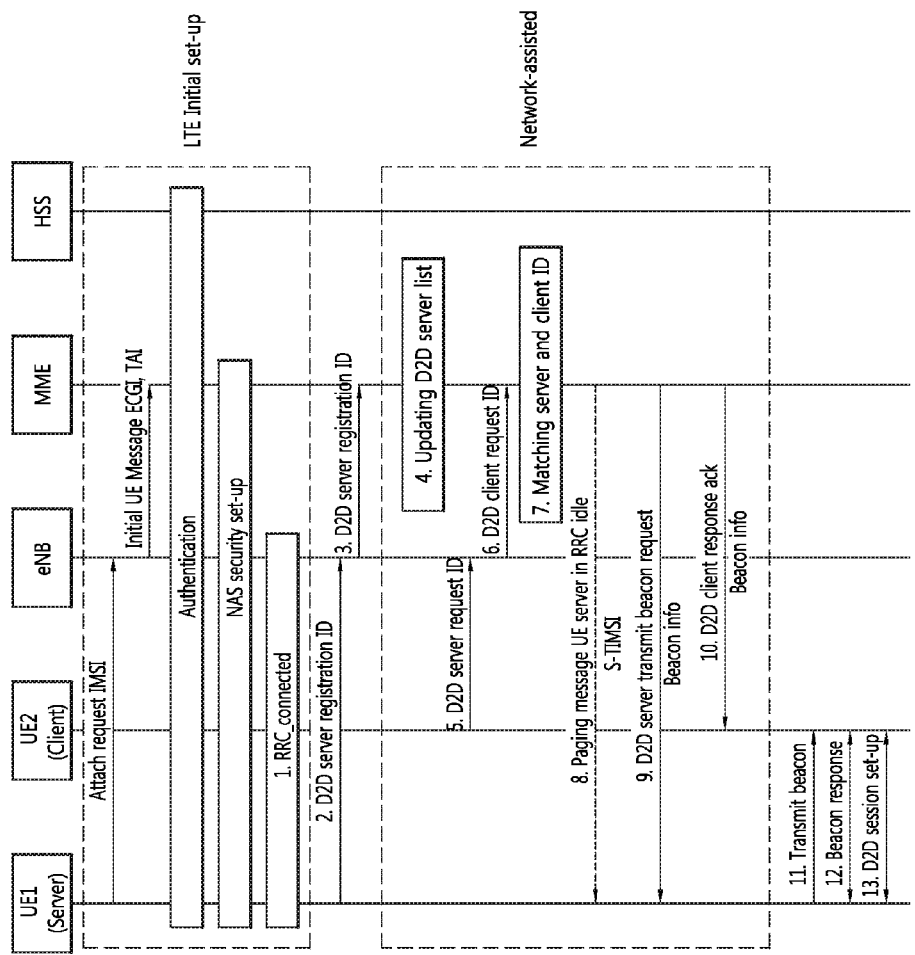
FIG. 12 shows an example of a peer discovery method for D2D.

FIG. 12 shows an example of a peer discovery method for D2D. The present example shows a discovery method in which a D2D UE is registered in advance to an MME (i.e., a priori-registration method).

Referring to FIG. 12, among D2D UEs, a server UE, i.e., a UE1, may be registered to the MME in an RRC_connected state. For this, the server UE may transmit a D2D server registration request message to an eNB (step 2), and the eNB may deliver the D2D server registration request message to the MME (step 3). The D2D server registration request message may include identification information (e.g., a server ID, a UE ID, a D2D group ID, a service ID, etc.) required for D2D communication. The MME may update a D2D server list by using the D2D server registration request message (step 4). Thereafter, a client UE, i.e., a UE2, may request D2D to a D2D server UE in the same network (steps 5 and 6). Specifically, the client UE may transmit the D2D request message to the eNB (step 5), and the eNB may deliver the D2D request message to the MME (step 6). The D2D request message may include identification information (e.g., a client ID, a UE ID, a D2D group ID, a service ID, etc.) required for D2D communication. If there is a server UE corresponding to the D2D request (step 7), the MME may request the server UE to transmit a D2D discovery signal (steps 8 and 9), and may request the client UE to receive the D2D discovery signal (step 10). Specifically, if the server UE is in an idle state, the MME may report to the server UE a presence of the D2D request through a paging message (step 8), and thereafter may transmit a beacon request message (step 9). The beacon request message may include information regarding a beacon transmission resource (e.g., a sequence index, a time-frequency resource, a transmission period, etc.). Herein, the beacon signal is used for a discovery usage. Further, the MME may transmit a response message for the D2D request message to the UE (step 10). Herein, the response message may include information regarding resource information (e.g., a sequence index, a time-frequency resource, a transmission period, etc.) for receiving a beacon signal to be transmitted by the D2D server. Thereafter, the server UE and the client UE may discover each other on the basis of the beacon signal (steps 11 and 12), and may set up a D2D communication session (step 13).

Meanwhile, if the server UE has mobility in the idle state, it may move to a neighbor cell or a neighbor tracking area (TA) or optionally may move to the coverage of a neighbor MME. In this case, it is regarded that two UEs are located in different networks. Therefore, a paging message cannot be sent, or is inevitably sent through a complex procedure with a great time delay. The UE has a TA list as to a registered network, and upon entering a TA not existing in the TA list, may perform a TA update, and an MME change may be accompanied together. The TA list implies a TA identity (TAI) list, and TAs in the TA list are managed by the same MME. The TAI indicates TA identification information. In general, one TA includes a plurality of eNBs.

Meanwhile, in the D2D communication, a discovery requirement may differ for each service. For example, a device discovery requirement may not be high as to a service for an advertisement of a shop or the like in a street or the like. That is, a peer device is not necessarily to be discovered within a very short time. On the other hand, as to a service having great mobility, the device discovery requirement may be high similarly to a case of discovering the peer device within a relatively short time.

Meanwhile, a discovery may be performed when a specific device transmits a discovery signal (DS) and another device receives the DS. A transmission/reception period of the DS may vary by considering a service, mobility, a UE battery status, interference having an effect on UEs participating in D2D communication, or the like. If one pair of UEs each of which receives a different service attempts the discovery at the same time point for the D2D communication, interference between the UEs may be temporarily increased.

It is assumed that a set of resources for transmitting the DS is denoted by D (hereinafter, the same is applied). The D may be indicated by a set of frame numbers or a set of subframe numbers at which the DS is transmitted.

For example, if a minimum period with which a DS of a specific UE or UE group is transmitted is denoted by 'a', a set D of system frame numbers (or subframe numbers) at which the DS is transmitted may be expressed as follows.

$$D=[SFN\#n, SFN\#(n+a), SFN\#(n+2a), \ldots] \quad \text{[Equation 12]}$$

The D may also be called a system frame number (SFN) set.

'a' may be set to satisfy a minimum discovery requirement among UEs for transmitting/receiving a DS. If discovery requirements of respective UEs or UE pairs are denoted by a_1, a_2, . . . , a_N, the 'a' may be a minimum value among {a_1, a_2, . . . , a_N} or may be one of common divisors of corresponding values.

That is, the 'a' may be expressed by the following equation.

$$a \leq \min[a\_1, a\_2, \ldots, a\_N] \quad \text{[Equation 13]}$$

Although all UEs may transmit a DS at every same period 'a', only some UEs may transmit the DS according to battery consumption of each UE or in order to prevent a collision of the DS. If the number of UEs is excessively great in comparison with a resource amount of the DS, different UEs may transmit the same DS by using the same resource, which is called a collision.

Figure 13:
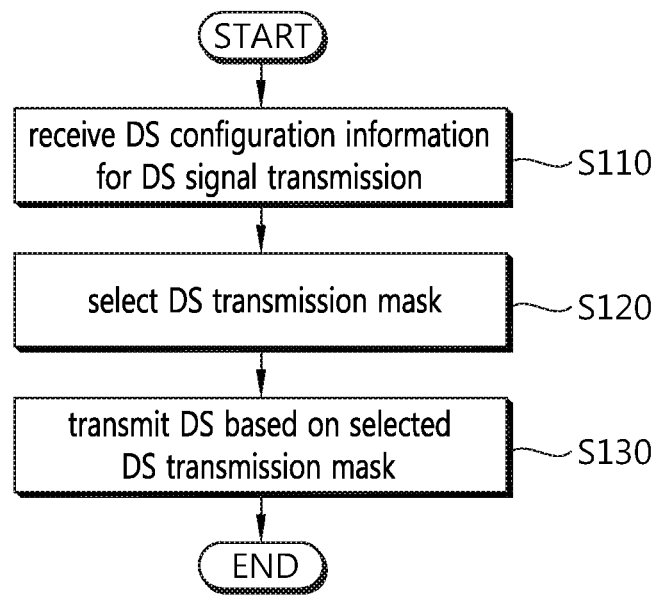
FIG. 13 shows a method of transmitting a discovery signal (DS) according to an embodiment of the present invention.

FIG. 13 shows a method of transmitting a discovery signal (DS) according to an embodiment of the present invention.

Referring to FIG. 13, a UE may be first in a state where information regarding a set D of DS transmission subframes is well-informed in advance through RRC signaling, higher layer signaling, or a pre-defined pattern. Subsequently, the UE receives DS configuration information for DS transmission (S110). The DS configuration information may include information regarding a plurality of discovery signal transmission masks. Hereinafter, the discovery signal transmission mask is called a DS transmission mask to be described below.

The UE selects the DS transmission mask (S120). The UE may use one DS transmission mask directly reported by an eNB, a network, or a D2D UE, or may select one of the plurality of DS transmission masks reported through the DS configuration information.

The UE transmits the DS on the basis of the selected DS transmission mask (S 130).

Now, each step will be described in detail.

The DS configuration information provides configuration information for DS transmission to UEs capable of performing D2D communication. The DS configuration information may be used to report the DS transmission masks to the UEs.

As to one UE, the DS transmission mask may be defined to indicate whether the DS is transmitted. It is assumed that the DS transmission mask is denoted by M.

For example, M may be as follows.

M=[1,0,1,1,0,1,1, . . . ]

In the above M, a resource capable of transmitting the DS may be marked by 1, and a resource not transmitting the DS may be marked by 0.

Meanwhile, if it is assumed that the DS is transmitted with a specific period according to a discovery requirement, a mask for transmitting a DS having a period corresponding to N times of a minimum period will be marked with 1 at a specific transmission time point, followed by (N−1) zero values.

For example, there may be N DS transmission masks as follows.

$M_0$=[1,1,1,1,1, . . . ]
$M_1$=[1,0,1,0,1,0,1,0,1, . . . ]
$M_2$=[1,0,0,1,0,0,1,0,0,1,0,0,1, . . . ] . . .
$M_N$=[1,0, . . . 0,1,0 . . . 0,1,0, . . . 0,1,0, . . . 0,1, . . . ]

The UE may select a specific DS transmission mask by considering a service, battery consumption, or the like when selecting the DS transmission mask.

The N DS transmission masks may be configured such that a great DS transmission opportunity is provided starting from a small index ($M_0$), and the DS transmission opportunity is small in case of a great index ($M_N$). Of course, the other way around is also possible.

In the above example, upon selecting one of the N DS transmission masks, the UE may determine an SFN set T. T denotes a set of system frame numbers at which a real DS is transmitted. T may be determined as follows.

$$T = \otimes D \quad \text{[Equation 14]}$$

In the above equation, $\otimes$ denotes a Kronecker product. If M is constructed of ($m_i$) (i=0, 1, 2, . . . ), M$\otimes$D may be expressed by $m_i$D. For example, if M is constructed of ($m_0$, $m_1$, $m_2$)=(1 0 1) and D=(1011), M$\otimes$D may be expressed by $m_0$D, $m_1$D, $m_2$D=1011 0000 1011.

For example, transmitting of the DS during first 64 ms within a duration of 10 seconds may be defined such as T=M$\otimes$D, where D=[1 1 1 . . . 1] (configured of 16 ones), M=[1 1 1 1 0 . . . 0 0](configured of 4 ones and 621 zeros), thereby expressing a structure of a subframe set capable of transmitting the DS. According to T=M$\otimes$D, T is expressed by [D D D D 0 . . . 0 0] (4 Ds and 9936 zeros). One subframe is 1 ms, and D indicates 16 subframes. Therefore, 4 Ds indicate initial 64 subframes (64 ms), and the remaining 9936(=16×621) zeros indicate 9936 subframes (9936 ms).

In the above method, all Ds as a set of resources capable of transmitting the DS are multiplied by each element of M. If it is intended to indicate an operation in which the DS is transmitted in some time points in the aforementioned D and the DS is not transmitted in the remaining time points, a component wise product is performed on D and M. In this case, T' which is a set of system frame numbers at which the DS is transmitted may be expressed as follows. Herein, D and M have the same size.

$T'=D·M$. or $M·D$.

The UE may transmit the DS in a frame marked by 1 in an SFN set T determined on the basis of the selected DS transmission mask.

A time point at which N DS transmission masks commonly have a value 1 may be called a region in which a DS is transmitted with a high priority. The UE which must receive the DS may be in a state of being aware of the N masks. Therefore, at which frame (or subframe) the DS will be transmitted with a high probability can be determined. The UE which must receive the DS may search for the DS only in a specific frame (or subframe) according to a battery status.

When the UE for performing D2D communication is located within the coverage of a specific eNB or is capable of being assisted by a network, the aforementioned SFN set, DS transmission mask, or the like may be delivered from the eNB. Further, when UEs form a cluster even if being located outside the coverage of the eNB, one of the UEs forming the cluster may play a role of transmitting the SFN set, the DS transmission mask, or the like to the remaining UEs. Meanwhile, if both of the two cases are not applied, a UE intending to transmit the DS may determine the SFN set or vectors constituting at least DS transmission mask by directly sensing a channel. For example, the UE may configure the SFN set or the at least DS transmission mask by randomizing transmission timing, period, or the like of the DS.

In the above example, it is exemplified a case where the UE receives the DS configuration information from the eNB, and the DS configuration information includes information regarding the plurality of DS transmission masks. However, the present invention is not limited thereto, and thus the UE may directly receive information on a specific DS transmission mask from a network or another UE. In this case, the UE may transmit the DS on the basis of the specific DS transmission mask. The UE may select one of the specific DS transmission mask and the plurality of DS transmission masks included in the DS configuration information.

Meanwhile, the DS transmission mask may have a different offset value for each UE. The offset value may indicate an amount of cyclic shift achieved on values constituting the DS transmission mask. That is, values of the DS transmission mask may be cyclic-shifted by the offset value.

For example, if the offset value is 1, the N DS transmission masks may be changed as follows.

$M_0'$=$M_{01}$=[1,1,1,1,1, . . . ]
$M_1'$=$M_{11}$=[0,1,0,1,0,1,0,1,0,1 . . . ]
$M_2'$=$M_{21}$=[0,1,0,0,1,0,00,1,0,0,1,0,0, . . . ] . . .
$M_N'$=$M_{N1}$=0,1,0, . . . 0,1,0, . . . 0,1,0 . . . 0,1,0, . . . 0,1,0, . . . 0,1 . . . ]

The offset value may be signaled by being included in the DS configuration information or may be selected by each UE among predetermined values.

A UE pair having a strict discovery requirement must more frequently perform a discovery procedure and rapidly complete the discovery procedure. However, during the UE pair performs the discovery procedure, other UEs may be persistently interfered on resources for transmitting the DS. Therefore, it is appropriate for the UE pairs having the strict discovery requirement to first attempt the discover procedure and complete the discovery procedure, and thereafter to gradually decrease interference having an effect on other UE pairs. By considering such an aspect, a DS transmission mask of a low index may be assigned to the UE having the strict (high) discovery requirement, and a small offset value may be assigned thereto.

If a plurality of UEs using DS transmission masks having the same index are present, the same offset value may be assigned or different offset values may be assigned to these UEs.

For example, if many UEs are distributed in a specific region, the same offset value may be assigned, and if the UEs can be clustered, different offset values may be assigned.

It is assumed that the DS transmission mask is defined by being indexed as follows.

DS transmission mask #0=[1,1,1,1, . . . ]
DS transmission mask #1=[1,0,1,0,1, . . . ]
DS transmission mask #2=[1,0,0,1,0,0,1,0,0,1, . . . ]

If a plurality of UEs use a DS transmission mask #0, the plurality of UEs may transmit a DS in the same frame or subframe. In this case, if the same resource, more specifically, the same resource block is used in the frame or the subframe, mutual interference eventually occurs. Further, although UEs which use DS transmission masks #1 and #2 may be able to avoid interference in some cases, the interference is not avoidable in other cases.

To decrease the interference, a resource for transmitting the DS needs to be divided and used. For example, a region for transmitting the DS may be defined as a set of physical resource block (PRB) pairs in a frame or a subframe. In this case, the PRB pair for transmitting the DS in a set of the PRB pairs may be determined according to an offset value determined on the basis of an identifier (ID) of the UE.

It is assumed that the total number of PRB pairs capable of transmitting the DS is denoted by K. A start point of a PRB pair index at which the DS starts to be transmitted may be defined as follows.

$$K \bmod UE\_ID \qquad [\text{Equation 15}]$$

In the above equation, mod implies a modular operation, and UE ID implies an ID of a transmitting UE.

If a resource region in which a DS is transmitted is sufficiently great, interference can be sufficiently avoided by using the aforementioned method.

If the resource region in which the DS is transmitted is not sufficiently great or if there is a need to acquire an additional interference avoidance effect, a DS transmission mask may be designated in a UE-specific manner.

If all respective DS transmission masks are defined to transmit the DS at the same time point, a great amount of interference occurs temporarily. Therefore, a different offset value may be given to each DS transmission mask.

Further, since the number of UE pairs which use the respective DS transmission masks may be great, offset values may be assigned by being dispersed to the maximum extent possible.

The offset value is assigned for example as follows.

TABLE 1

| Index | DS transmission mask | Offset value |
|---|---|---|
| $M_{00}$ | [1,1,1,1,1,1,1,1, . . .] | N/A |
| $M_{11}$ | [0,1,0,1,0,1,0,1, . . .] | 1 |
| $M_{12}$ | [1,0,1,0,1,0,1,0, . . .] | 2 |
| $M_{23}$ | [1,0,0,1,0,0,1,0,0, . . .] | 3 |

TABLE 1-continued

| Index | DS transmission mask | Offset value |
|---|---|---|
| $M_{24}$ | [0,1,0,0,1,0,0,1, . . .] | 4 |
| $M_{25}$ | [0,0,1,0,0,1,0,0, . . .] | 5 |

In the method of Table 1, an offset is applied to a basic mask in a cyclic shift type. However, the number of basic masks may not be great, and there may be a case where the masks result in the same type even if the masks have different offset values. For example, according to the rule of Table 1, a DS transmission mask #2 ($M_{26}$) having an offset value of 6 will have the same type as $M_{23}$.

Accordingly, the offset value may be applied in a zero-padding type instead of applying in the cyclic shift type.

In this case, the DS transmission mask may be configured as shown in the following table.

TABLE 2

| Index | DS transmission mask | Offset value |
|---|---|---|
| $M_{00}$ | [1,1,1,1,1,1,1,1, . . .] | N/A |
| $M_{11}$ | [0,1,0,1,0,1,0,1, . . .] | 1 |
| $M_{12}$ | [0,0,1,0,1,0,1,0, . . .] | 2 |
| $M_{23}$ | [0,0,0,1,0,0,1,0,0,1,0,0, . . .] | 3 |
| $M_{24}$ | [0,0,0,0,1,0,0,1,0,0,1, . . .] | 4 |
| $M_{25}$ | [0,0,0,0,0,1,0,0,1,0,0, . . .] | 5 |

Meanwhile, a type of the DS transmission mask may be predetermined according to a service requirement. Further, it may be delivered also to a UE for receiving a DS. Therefore, the UE for receiving the DS may know a mask index.

If an index of the DS transmission mask is denoted by M and a size of the DS transmission mask is denoted by S, the offset value may be determined as shown in the following equation.

$$[M+\{UE\_ID \bmod(M+1)\}] \bmod S \qquad [\text{Equation 16}]$$

Figure 14:
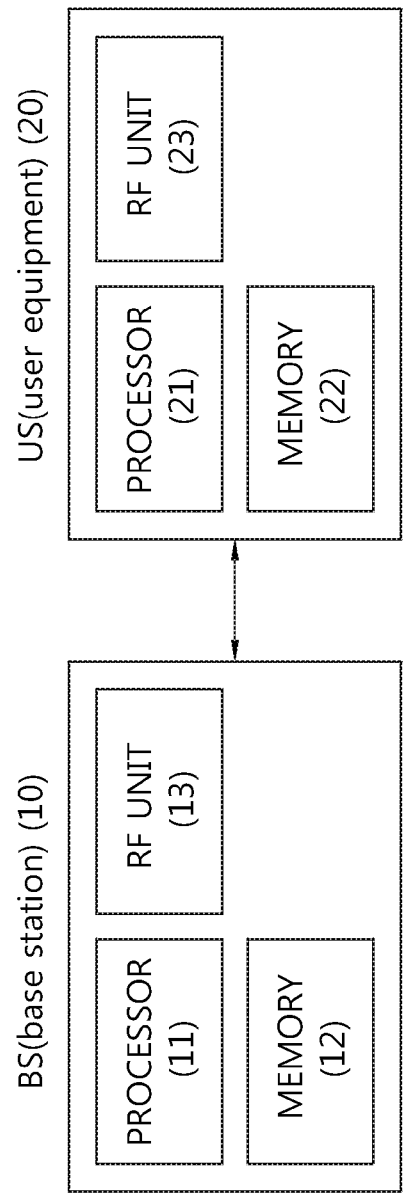
FIG. 14 is a block diagram showing a BS and a UE.

FIG. 14 is a block diagram showing a BS and a UE.

A BS 10 includes a processor 11, a memory 12, and a radio frequency (RF) unit 13. The processor 11 implements the proposed function, procedure, and/or method. The memory 12 is coupled to the processor 11, and stores a variety of information for driving the processor 11. The RF unit 13 is coupled to the processor 11, and transmits and/or receives a radio signal.

A UE 20 includes a processor 21, a memory 22, and an RF unit 23. The processor 21 implements the proposed function, procedure, and/or method. The memory 22 is coupled to the processor 21, and stores a variety of information for driving the processor 21. The RF unit 23 is coupled to the processor 21, and transmits and/or receives a radio signal.

The processors 11 and 21 may include an application-specific integrated circuit (ASIC), a data processor and/or a converter for mutually converting a baseband signal and a wireless signal. The memories 12 and 22 may include a read-only memory (ROM), a random access memory (RAM), a flash memory, a memory card, a storage medium and/or other storage devices. The RF units 13 and 23 may include at least one antenna to transmit and/or receive the wireless signal. When the embodiment is implemented by software, the above scheme may be implemented by a module (procedure, function, and the like) to perform the above function. The module is stored in the memories 12 and 22 and may be implemented by the processors 11 and 21. The memories 12 and 22 may be installed inside or outside the processors 11 and 21, and may be connected to the processors 11 and 21 through various known means.

What is claimed is:

1. A method of transmitting a discovery signal (DS) of a terminal supporting device-to-device (D2D) communication, the method comprising:
  receiving directly information regarding a specific DS transmission mask or receiving DS configuration information;
  selecting the specific DS transmission mask or one of a plurality of DS transmission masks reported through the DS configuration information; and
  transmitting the DS on the basis of the selected DS transmission mask.

2. The method of claim 1, wherein each of the plurality of DS transmission masks indicates a resource capable of transmitting the DS.

3. The method of claim 2, wherein the resource is a system frame or subframe.

4. The method of claim 1, wherein the plurality of DS transmission masks are indexed in an ascending order, and are configured such that the lower the index, the higher the probability of transmitting the DS.

5. The method of claim 1, wherein the DS configuration information further comprises an offset value for each of the plurality of DS transmission masks.

6. The method of claim 5, wherein the offset value indicates an amount of cyclic shift achieved on values constituting the DS transmission mask.

7. The method of claim 5, wherein the offset value is determined on the basis of an identifier (ID) of the terminal.

8. The method of claim 1, wherein the DS is transmitted on at least one resource block pair in a frame or subframe determined on the basis of the selected DS transmission mask.

9. The method of claim 8, wherein the at least one resource block pair is determined on the basis of an ID of the terminal.

10. The method of claim 1, wherein the DS is transmitted in at least first 64 subframes in 1000 contiguous system frames.

11. The method of claim 1, wherein the information regarding the specific DS transmission mask or the DS configuration information is received from a base station, a network, or another terminal.

12. A terminal comprising:
  a radio frequency (RF) unit for transmitting/receiving a radio signal; and
  a processor operatively coupled to the RF unit,
  wherein the processor is configured for:
  receiving directly information regarding a specific discovery signal (DS) transmission mask or receiving DS configuration information;
  selecting the specific DS transmission mask or one of a plurality of DS transmission masks reported through the DS configuration information; and
  transmitting the DS on the basis of the selected DS transmission mask.

* * * * *